United States Patent [19]

Gneiss et al.

[11] Patent Number: 4,486,643

[45] Date of Patent: Dec. 4, 1984

[54] METHOD FOR SECURING ELECTRICALLY CONDUCTIVE WIRES TO A SURFACE

[75] Inventors: Heinz Gneiss, Ludwigsburg; Peter Romann, Stuttgart, both of Fed. Rep. of Germany

[73] Assignee: Robert Bosch GmbH, Stuttgart, Fed. Rep. of Germany

[21] Appl. No.: 382,453

[22] Filed: May 24, 1982

[30] Foreign Application Priority Data

Aug. 1, 1981 [DE] Fed. Rep. of Germany ....... 3130634

[51] Int. Cl.³ .............................................. B23K 1/00
[52] U.S. Cl. ................................ 219/85 CM; 73/204; 219/56.22; 219/85 D
[58] Field of Search .......... 219/85 CA, 85 CM, 85 F, 219/85 G, 85 M, 85 R, 56.1, 56.21, 56.22, 56; 73/204

[56] References Cited

U.S. PATENT DOCUMENTS

| | | | |
|---|---|---|---|
| 1,660,805 | 2/1928 | Moineau | 219/85 CA |
| 2,324,809 | 7/1943 | Abbott et al. | 219/85 CM |
| 4,299,124 | 11/1981 | Knapp et al. | 73/204 |
| 4,299,125 | 11/1981 | Romann et al. | 73/204 |
| 4,397,179 | 8/1983 | Romann | 73/204 |

Primary Examiner—C. C. Shaw
Attorney, Agent, or Firm—Edwin E. Greigg

[57] ABSTRACT

A method of securing a hot wire to holder wires within a carrier body by means of heating and soldering material applied to the holder wires. In this method, holder wires are provided with a layer of soldering material and secured in a carrier body, while in a second operation each holder wire is placed in a tool between conductive poles of an electrical current circuit. In a third operation, the hot wire to be secured in place is placed at each holder wire between the conductive poles of an electrical current circuit which in the fourth operation is operative in a manner limited in duration, until the melting temperature of the soldering material has been attained. The wires are held in place until the melted solder solidifies. The method according to the invention enables the automated contacting of electrically conductive wires such that the connection is capable of withstanding both corrosion and high temperatures.

4 Claims, 2 Drawing Figures

METHOD FOR SECURING ELECTRICALLY CONDUCTIVE WIRES TO A SURFACE

BACKGROUND OF THE INVENTION

The invention is based on a method as generally described for securing electrically conductive wires onto a surface. A method for securing electrically conductive wires has already been proposed, in which a hot wire or holder wires secured in a sensor ring is secured to a surface by use of an oxyhydrogen flame which heats the wire and causes a gold solder to melt, which secures the wire in place. With such a method, a danger exists by which undesirable overheating can occur at the relatively thin wires. Furthermore it is relatively difficult to supply small quantities of gold solder, and it is difficult to automate the method.

OBJECT AND SUMMARY OF THE INVENTION

The method according to the invention for securing electrically conductive wires having the characteristics set forth has the advantage over the prior method that the soldering temperature can be adjusted or regulated satisfactorily via the electrical voltage, and the heating effect is concentrated at the soldering location, so that overheating of the wires is prevented. Furthermore, the soldering material is applied as a layer to the wire, so that supplying the soldering material separately is unnecessary.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
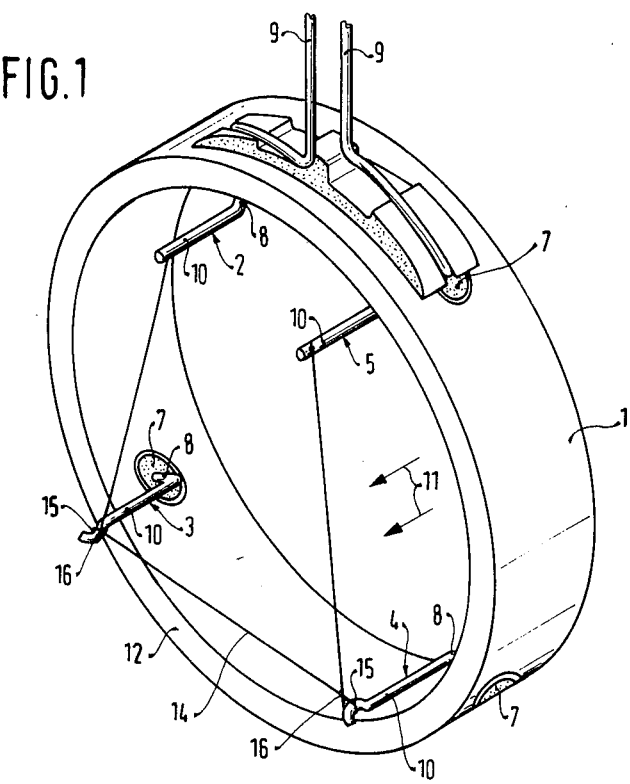
FIG. 1 shows a carrier body with a hot wire fastened on it for measuring the flow rate of a flowing medium.

FIG. 1 shows an annular carrier body 1, which naturally may have some other efficacious shape instead, with four holder wires 2, 3, 4, 5. The holder wires are of electrically conductive material, for instance platinum wire about 0.4 mm thick, or a platinum-surface wire having a core of an iron-nickel alloy and a platinum jacket and secured in the carrier body via glass fusion points 7. The holder wires 2, 3, 4, 5 have an axially extending portion and a radial section 8 directed in the radial direction into the interior of the carrier body 1; the fastening of the holder wire is effected in this radial section 8 via glass fusions 7. The holder wires 2 and 5 furthermore have outwardly extending connector sections 9 adjoining the radial sections 8 that pass through the glass fusion 7; these connector sections 9 lead to a known electronic control unit (not shown). In the interior of the carrier body 1, axially extending bent sections 10 adjoin the radial sections 8 of each holder wire 2, 3, 4, 5; the bent sections 10 are bent at an angle of ca. 90° relative to the radial sections 8 and extend approximately parallel to the flow direction 11 of a medium mass flowing thought the carrier body 1. The bent sections 10 of the holder wires 2, 3, 4, 5 can protrude outward beyond an end face 12 of the carrier body 1. A so-called hot wire 14 is stretched out on these bent sections 10 of the holder wires 2, 3, 4, 5 protruding beyond the end face 12 in such a way that it extends from the holder wire 2 to the holder wire 3 and from there via the holder wire 4 to the holder wire 5; the hot wire 14 is soldered to the bent sections 10 of the holder wires 2 and 5, while it is guided only loosely, in the form of a loop, over the bent sections 10 of the holder wires 3 and 4. The intersecting wire sections at each loop 15 are connected with one another in an electrically conductive manner in a contact zone 16. As a result, the loop 15 carries no current and is not heated by any current. The hot wire 14 may equally well be made of platinum wire and its thickness is approximately 0.07 mm. The use of a temperature-dependent resistor in the form of a hot wire for measuring the mass of a flowing medium is already known, for instance for ascertaining the mass of air aspirated by an internal combustion engine; to this end, the carrier body 1 with the hot wire 14 fastened onto it is disposed in the air intake tube of the engine. The hot wire 14 is supplied with current by means of an electronic control unit (not shown) via the connector sections 9, and the supply of current is regulated in such a manner that the hot wire 14 warms up to a predetermined temperature which is above the average air temperature of the aspirated air mass. If the flow velocity then increases—that is, if the quantity of air aspirated per unit of time increases—then the hot wire 14 cools down to an increased extent, thereby decreasing its resistance. This cooling is fed back to the electronic control unit, which thereupon causes a higher current to be supplied to the hot wire 14, until the specified temperature value and resistance has again been established at the hot wire 14. This control variable of the electronic control unit simultaneously represents a measure of the aspirated air mass, which can be delivered as a measurement variable to a metering circuit of the engine in order to adapt the required fuel quantity to the quantity of air aspirated per unit of time.

Figure 2:
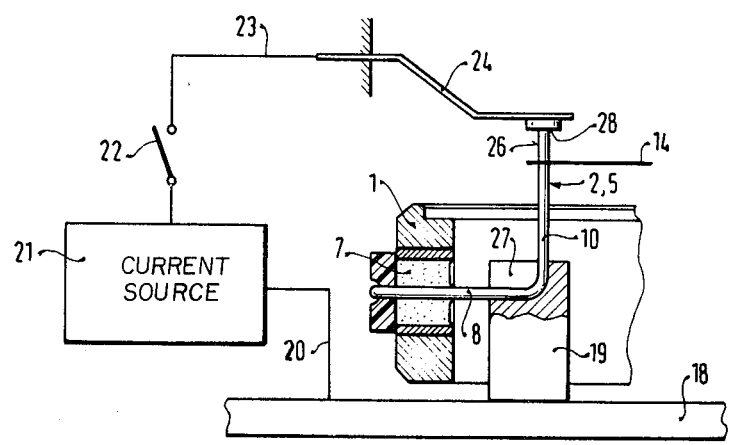
FIG. 2 shows an apparatus for performing the method according to the invention, by way of example for contacting a hot wire to holder wires, which are secured in a carrier body such as that shown in FIG. 1.

FIG. 2 schematically shows an apparatus with which the securing of the hot wire 14 to the holder wires 2, 5 can be accomplished. A tool 18 is provided which has a pair of electrically conductive receptor poles 19, only one being shown, which are connected via an electrical connector line 20 with a source of current 21. A timing element, for instance an RC member, is contained in the current source 21. On the other end, an electrical connector line 23 leads via a switch 22 to a pair of yielding poles 24. In order to perform the method according to the invention, in a first operation each holder wire 2, 3, 4, 5 is secured in the carrier body 1. The holder wires 2 and 5 are provided at least in one zone of their bent section 10 with a layer 26 of soldering materials; in the case of platinum wires, pure gold is preferably used as the soldering material. The soldering material layer 26 may be applied to the holder wires 2, 5 by electroplating in a layer approximately 0.003 mm to 0.005 mm thick. In a second operation, the carrier body 1 is then placed in the tool 18 such that the holder wires 2, 5 come to rest in matching recesses 27 of the receptor poles 19, while the yielding poles 24 on the free end 28 engage the holder wires 2, 5. In a third operation, the hot wire 14 which is to be contacted is then placed on the holder wire 2 and 5 at each bent section 10 having an appropriate soldering material layer 26, which is defined on one end by the receptor pole 19 and on the other by the yielding pole 24. The closure of the current circuit 20, 21, 23 by means of the switch 23 causes the bent section 10 of the holder wires 2, 5 to heat up, on the principle of resistance heating, to a temperature which suffices to melt the soldering material 26; in the case of pure gold, this temperature is approximately 1,060° C., so that the soldering material 26 effects a connection between the holder wires 2, 5 and the hot wire 14 which is capable of withstanding both corrosion and temperatures of approximately 900° C. The precise adjustment of the required electrical voltage at the current source 21 and the limitation of the duration of the heating process by the timing element assure a soldered connection without there being any danger of overheating of the wires to be thus connected. The method according to the invention furthermore has the advantage that it can be automated.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A method for securing an electrically conductive hot wire to a holder wire, which said hot wire is stretched over a plurality of holder wires in a carrier body for measuring a mass of a flowing medium, comprising applying by electroplating a layer of soldering material to a portion of said holder wires to which said hot wire is to be secured, stretching said hot wire over said plurality of holder wires with opposite ends of said hot wire in contact with said layer of solder materials on said holder wires to which said hot wire is to be secured, directing an electrical current through said holder wires with the soldered portions electroplated thereon to heat said holder wires in a manner limited in duration, until the melting temperature of the layer of soldering material has been attained and discontinue applying the current to said holder wires to permit a melted solder to solidify thereby forming a secure soldered connection between the holder wires and the hot wire.

2. A method as defined by claim 1, characterized in that said hot wire is secured at a bent section of the holder wire.

3. A method as defined by claim 2, characterized in that the hot wire to be secured to said holder wire is embodied of platinum and the holder wires are embodied of platinum or is provided with a platinum jacket, and the soldering material layer applied to the holder wire is of gold.

4. A method as defined by claim 1, characterized in that the hot wire to be secured to said holder wire is embodied of platinum and the holder wires are embodied of platinum or is provided with a platinum jacket, and the soldering material layer applied to the holder wire is of gold.

* * * * *